United States Patent
Katsuragawa et al.

[11] Patent Number: 5,991,075
[45] Date of Patent: Nov. 23, 1999

[54] LIGHT POLARIZER AND METHOD OF PRODUCING THE LIGHT POLARIZER

[75] Inventors: Tadao Katsuragawa, Zama; Ikue Kawashima, Kobe; Yasuhiro Satoh, Kato-gun, all of Japan

[73] Assignee: Ricoh Company, Ltd., Tokyo, Japan

[21] Appl. No.: 08/978,022

[22] Filed: Nov. 25, 1997

[30] Foreign Application Priority Data

Nov. 25, 1996 [JP] Japan .................................. 8-329198

[51] Int. Cl.$^6$ ........................................ G02B 5/30
[52] U.S. Cl. .................. 359/486; 359/490; 427/163.1
[58] Field of Search ................................ 359/483, 486, 359/487, 488, 490, 494, 495, 613, 614, 572, 580; 427/163.1

[56] References Cited

U.S. PATENT DOCUMENTS

| | | | |
|---|---|---|---|
| 3,453,039 | 7/1969 | Osborne | 359/613 |
| 3,942,873 | 3/1976 | Shimotakahara | 359/572 |
| 4,512,638 | 4/1985 | Sriram et al. | 359/486 |
| 5,245,471 | 9/1993 | Iwatsuka et al. | 359/495 |

FOREIGN PATENT DOCUMENTS 1-93702  4/1989  Japan .

Primary Examiner—Ricky D. Shafer
Attorney, Agent, or Firm—Oblon, Spivak, McClelland, Maier & Neustadt, P.C.

[57] ABSTRACT

A polarizer and method of making the polarizer includes forming plural grooved lines on a surface of a supporting body that is transparent to visible light. The plural grooved lines are straight, concave and parallel to one another. Respective of the plural grooved lines include a sidewall portion that has a fine line formed thereon where the fine line constitutes a residual portion of a larger thin film that was subjected to an etching process. The fine line is composed of a semiconductor a metal or a combination of the two.

9 Claims, 1 Drawing Sheet

LIGHT POLARIZER AND METHOD OF PRODUCING THE LIGHT POLARIZER

BACKGROUND OF THE INVENTION

1. Field of the Invention

The present invention relates to a polarizer that converts circularly polarized light into linearly polarized light in a visible light range, and more particularly relates to the polarizer and method of making the polarizer which has a fine line therein that enables the polarizer to serve as a high transmittance polarizer for use in a display, such as a computer display.

2. Discussion of the Background

Several examples of conventional polarizer, and the problems associated therewith are descried below.

A first conventional method of forming method a polarizer and a polarizing plate is explained in Japanese Laid Open Patent Application No. 01-93702. In this document a polarizing plate is made according to a straight-forward manufacturing process, where the plate has excellent optical properties. The polarizing plate includes many rod elements arranged on a surface of a substrate in a predetermined direction and affixed thereto. The respective rod elements are made of fine ferromagnetic particles.

As identified by the present inventors, an uneven distribution of the respective elements in the polarizing layer is large, as is an unevenness of the rod element material itself. With respect to the material, it is necessary that the material exhibit a large light absorption and refractive index. However, such materials are not preferable at this point in time, for various reasons.

A second conventional polarizer is a wire grid polarizer that is described on Page 103 in "Physics of a Man of Today—Light and Magnetism", by Katsuaki Satoh of Tokyo Agriculture and Industry University, 1988. This paper describes a polarizer that functions on light having a longer wavelength than 2.5 $\mu$m. In this polarizer, a line of gold or aluminum is formed on a transparent substrate (silver bromide or polyethylene etc.) at a fine interval therein. In this case, when the interval of the line is d and the wavelength is $\lambda$, with respect to light having a wavelength $\lambda \gg d$, a transmission light becomes almost completely linearly polarized, with a vibrational surface that is vertical with respect to the line. For a middle infrared ray (i.e., $\lambda=2.5$ $\mu$m to 25 $\mu$m), the gold line is formed at an interval of d=0.3 $\mu$m on the substrate of silver bromide. For a long infrared ray (i.e., $\lambda=16$ $\mu$m to 100 $\mu$m), the aluminum line is formed at an interval of d=0.7 $\mu$m on the substrate of polyethylene. The respective degrees of polarization are generally thought to be about 97%.

As identified by the present inventors, a problem with this conventional apparatus is that the apparatus works on infrared rays having a relatively long wavelength, but does not function on rays in the visible light range. Moreover, in this wire method, a width of the line cannot be narrowed, such as to 500 Å or less.

POLAR CORE is a conventional product offered by Corning Company and is a glass material that has a polarization property owing to an arrangement of metallic silver that is extended in one direction. The material has advantages in that it is heat resistant, moisture resistant, chemical resistant, and resistant to damage by a laser, unlike conventional polarizers made of organic materials. This product is mainly for use on infrared rays, however, under special specification conditions the material may be used on visible light.

As identified by the present inventors, a limitation with POLAR CORE is that when it is used for visible light, the material has a brown-colored outward appearance. Thus, the material is not suitable for use in a display device because it is dark and does not have the needed contrast, as is the case with conventional polarizers made of organic materials. Further, the price of the material is high and it is difficult to make large units with this material. Moreover, a light transmittance characteristic of this material is between 400 nm to 800 nm (when a thickness is 2 mm), and thus, it is not enough.

A group of Tohoku University has described a micro wire array that has a surface of aluminum that becomes oxidized in an anode and becomes alumina, and a fine hole is formed therein. Ni or Cu etc. are inserted into the fine hole, and thereby the polarizer for the infrared ray is formed.

As identified by the present inventors, insufficient evidence is present on the characteristics of its light transmission, however, transmittance in the infrared ray range, which is a main utility range, is 85%, a low value. This group makes the polarizer by inserting a metallic particle layer in an island-like form, between glass layers so as to extend the metallic particle layer. However, a degree of polarization is not enough in the visible light range and thus it is also only suitable for use in long wavelengths in the infrared ray spectrum.

A laminating type polarizer is reported by Professor Shoujiro Kawakami of Electricity and Communication Laboratory in Tohoku University. The polarizer is for use in the visible light range and uses Ge (germanium) of 60 Å to 80 Å in thickness and $SiO_2$ of 1 $\mu$m in thickness alternately laminated so as to create a composite thickness in the neighborhood of 60 $\mu$m. A performance index $\alpha TE/\alpha TM$ (ratio of exhaustion constant of a TE wave and a TM wave) which is measured in the wavelength of 0.6 $\mu$m, is nearly 400, and the exhaustion ratio which is measured in the wavelength of 0.8 $\mu$m is 35 dB, which are adequate for visible light.

However, as identified by the present inventors, since the polarizer is formed by a sputtering method, a thickness of only 50 $\mu$m to 100 $\mu$m, at most, is formed. This thin film on the substrate is sliced in 3 $\mu$m to 35 $\mu$m in thickness and then used. The device is used as mounted to a light sensing system or a light wave guide device etc. A similar device that operates for a wave length of 850 nm or more is produced by the similar producing method and is sold as a product name of LAMI POLE by Sumitomo Osaka Cement Company. However, this method cannot be formed into a large size area.

The inventors' previous patent documents describe a technique in which the polarizer is formed by dispersing a metal or semiconductor particle of 100 Å or less in an organic solvent, and coating it on a transparent substrate in straight line form, and heating (burning) the same so as to form the polarizer.

On the other hand, the present invention is a method for forming the polarizer by general lithography techniques, and relates to a basic structure (a fine line being formed on one transparent supporting body), that improves the polarizer described in the previous patent documents. The present method for forming the polarizer involves making the fine line thinner, an improving the aspect ratio (ratio between height and width of the fine line) by making the aspect ratio larger so as to improve performance.

SUMMARY OF THE INVENTION

Accordingly, one object of the present invention is to overcome the above-described problems and limitations of the prior art.

Another object of the present invention is to provide a polarizer for polarizing a visible light that (1) polarizes a visible light with a device having a large area of 50 mm×50 mm or more that is easily formed, (2) exhibits a visible light transmittance of 90% or more and (3) is not colored so as to be suitable for use in a display device that functions in the visible light range.

These and other objects and advantages are achieved by the present invention which provides a polarizer and a method for making the polarizer to include plural straight grooved, concave lines on a surface of a transparent supporting body with respect to a visible light, and parallel each other. The polarizer is further made by forming a thin film composed of semiconductor and metal on the supporting body where the grooves are formed, and forming a fine line of a remaining thin film, by etching, so as to retain only a portion formed on a side wall of the grooved line within the thin film, on the supporting body.

BRIEF DESCRIPTION OF THE DRAWINGS

In describing preferred embodiment of the present invention illustrated in the drawings, specified terminology is employed for the sake of clarity. However, the invention is not intended to be limited to the specific terminology so selected, and it is to be understood that each specific element includes all technical equivalents which operate in a similar purpose.

A more complete appreciation of the present invention and many of the attendant advantages thereof will be readily obtained as the same becomes better understood by reference to the following detailed description, particularly when considered in connection with the accompanying drawings, wherein.

DESCRIPTION OF THE PREFERRED EMBODIMENTS

Figure 1A:
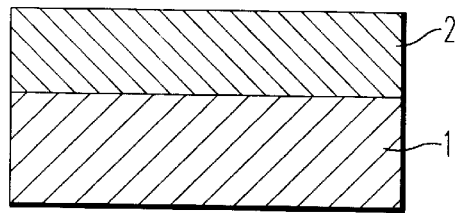
FIGS. 1A to 1H are sectional views of a polarizer of the present invention in successive stages of development according to one illustrative embodiment of a method for producing the polarizer.

Before turning the figures, a discussion is presented of several observations, on which the present invention is based, made by the present inventors. Suppose a semiconductor or a metal fine line of 50 Å to 300 Å in width×0.1 $\mu$m to 100 $\mu$m in height is formed at an interval of 0.5 $\mu$m to 1.5 $\mu$m on a transparent substrate. Under such conditions it has been empirically found that a light absorptance depends on an area, of width by height, of the fine line (in the case of the same material and the same line interval). However, it has also been observed that, in the case of the same area, when the width is thinner and the height is higher, namely an aspect ratio (height/width) is increased, a degree of polarization is improved. The structure of the present inventive polarizer is made in light of the observations such that the aspect ratio of the fine line is largely improved as is the degree of polarization of the polarizer.

In retrospect, the present inventors' earlier polarizers has an aspect ratio is about 10 to 50, but it was unknown that the aspect ratio was a result-dependent variable and so there was no reason to alter the aspect ratio as an attempt to improve the degree of polarization. However, as is now recognized from the above described experiments, the aspect ratio if increased to be in an inclusive range of 100 to 1000, the degree of polarization of 95% or more, nearing 100%, can be achieved.

Further, it was found that as a refractive index of the material used to make the line increased and light absorptance thereof increased, the degree of polarization improved. Ge and Si (amorphous, crystal) have some of the higher refractive indexes in visible light. Rh, Al, Ir, and Pt etc., have some of the larger light absorptance characteristics in the visible light range, however, the present inventors found that Ge and Si are suitable materials for obtaining the desired high degree of polarization.

In the polarizer of the present invention, included is a wall, which is generally is called a side wall in semiconductor production. As a transparent supporting body, an organic material that is typically transparent plastic, such as MMA resin, PMMA resin, polycarbonate resin, polypropylene resin, acrylic resin, styrene resin, ABS resin, polystyrene, polyacrylate, polysulfone, polyether sulfone, epoxy resin, poly-4-methylpetene-1, fluorine polyimido resin, fluororesin, phenoxy resin, polyolefine resin, diethylene glycol bisaryl carbonate, nylon resin, fluorene polymer etc. or inorganic transparent material such as glass, quartz, and alumina etc. are used.

Though a convex and a concavity are formed on a surface of this transparent supporting body by using lithography, a wall of the side surface of the concavity is called the side wall. A height of this sidewall is more easily formed vertically and deeply (to about 100 $\mu$m) with respect to a processed surface. When the transparent plastic described above is used as a substrate, $SiO_2$ thin film is formed on this substrate by a thin film forming method such as by PVD or CVD, and the convex and the concavity may be formed on a surface of the $SiO_2$ layer. Further, if the lithography method is used, the fine line is easily formed to be straight, within a fine tolerance.

A thin film of 50 Å to 300 Å of Ge or Si is formed on the surface of the convex and the concavity. In this method, PVD method, CVD method, or plating method are preferably used, however, the method is not limited particularly to those ones. In any case, those methods enable the formation of a narrower (thinner) film than the methods employed for conventional polarizers.

Subsequently, a portion parallel to the surface of the supporting body corresponding to the convex and the concavity is removed by an etching method (either of dry method or wet one is adopted), a fine line of Ge or Si having a large aspect ratio is formed in the residual thinned portion.

The present polarizer is easily formed by this method, and results in a device in which a large degree of polarization is achieved. Further, if a material transparent to visible light is buried in between the fine lines, the respective fine lines are fixed stably. Furthermore, a reflection prevention film, which may be a known material, is formed on one surface or both surfaces of the formed polarizer, so that an amount of a transmission light can be increased.

Referring now to the drawings, wherein like reference numerals designate identical or corresponding parts throughout the several views, a first and a second embodiment (which should not be construed as being mutually exclusive) of a polarizer is described.

EMBODIMENT 1

FIGS. 1(A)–1(H) are sectional views showing conceptually a structure of the polarizer at different successive stages in its formation. In the FIGS. 1A to 1H, numeral 1 is a $SiO_2$ substrate, numeral 2 is a resist material, numeral 3 is Ge thin film, numeral 4 is Ar ion, numeral 5 is a $Sio_2$ sputtered layer, and a size of the $SiO_2$ substrate is 50×50×1 mmt.

Figure 1E:
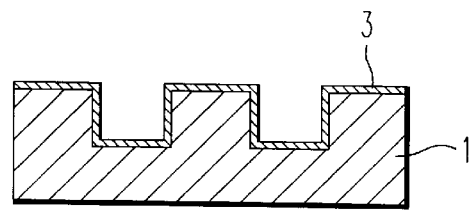
Figure 1B:
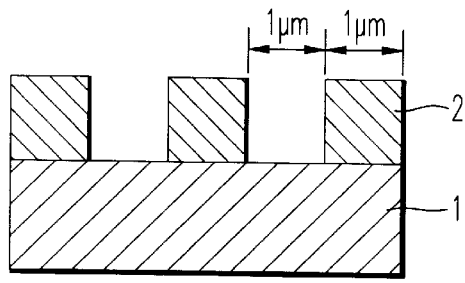

Describing the forming procedure of the polarizer, the resist 2 is laminated on the $SiO_2$ substrate 1, as shown in FIG. 1(A). Subsequently, a pattern is formed at a width and an interval of 1 μm, as shown in FIG. 1(B). An etching step is performed as shown in FIG. 1(C) where a depth of a concavity formed on the $SiO_2$ substrate 1 by this etching is made to be 2 μm. Then, the resist is removed as shown in FIG. 1(D), and a germanium (Ge) thin film is formed by sputtering the Ge on the substrate 1, including the side portions and bottom portions of the respective concavities, as shown in FIG. 1(E). At this time, a thickness of the Ge thin film 3 is made to be 80 Å.

Figure 1F:
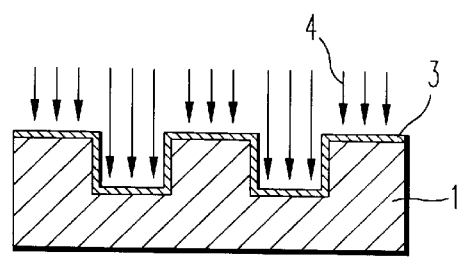
Figure 1C:
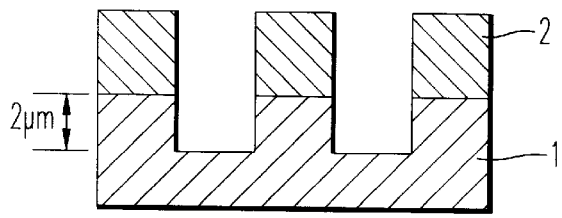
Figure 1G:
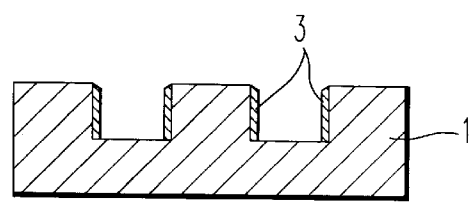
Figure 1D:
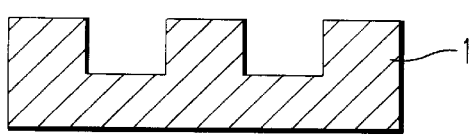
Figure 1H:
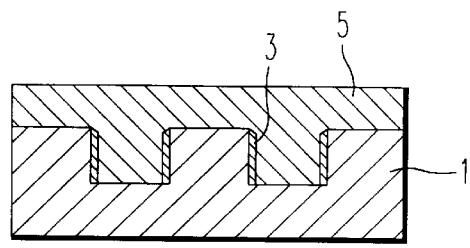

The horizontally oriented portions of the Ge thin film 3 are removed by etchback of whole surface by the Ar ion 4 (when reverse bias method where reverse bias voltage (−) is applied to the substrate side is used), the ion is incident to the substrate vertically as an arrow in FIG. 1(F), so only the film on the horizontal surfaces is removed. Consequently, the Ge is formed on the $SiO_2$ substrate 1 in a lattice form, and then $SiO_2$ is formed on the concavity by the sputtering method, as shown in FIG. 1(H). The polarizer may later be flatted by grinding. Then a layer of $MgF_2$ (n=1.38) is formed to be 1000 Å in thickness on both surfaces of the $SiO_2$ substrate, where the layer serves as the reflection prevention film and is formed by a vacuum evaporation method (not shown in the figure). By this reflection prevention film, a reflectance is reduced by 3%.

When the direction of an electric vector is vertical with respect to the straight lattice and is S polarization, and when the direction of the electric vector is horizontal with respect to the straight lattice and is P polarization, transmittance of S polarization (T1) of the polarizer formed as described above is 94% or more in the visible light range and transmittance of P polarization (T2) is 3% or less in the visible light range. Further, the degree of polarization (T1−T2/T1+T2) is 93% or more in the visible light range. This is a great improvement as compared to the 43% transmittance of iodine polarizing film which is often generally used (for example in liquid crystal display applications). Moreover, The aspect ratio of the Ge lattice of the polarizer described above is 20000 Å/80 Å, generally 250, which is a substantial improvement over the present inventors' previous devices as well as a substantial improvement over other devices.

As previously discussed, the POLAR CORE polarizer by Corning company has a silver metal portion that extends in one direction in a glass and is a light brown color having a transmittance of 80%, however, it is not suitable for a display in which contrast is important. The polarizer of the present invention is colorless and transparent and thus suitable for use in displays. Further, LAMI POLE (product name) sold by Sumitomo Osaka Cement company is 1 mm φ or less in area, unlike the present invention where a large area of 50×50 mm can be obtained.

EMBODIMENT 2

By using the same process steps as discussed with respect to embodiment 1, a polarizer is formed using Si instead of Ge, so that a lattice of Si is formed on the $SiO_2$ substrate. In the present embodiment, experimental results indicate T1 is 92% or more and T2 is 3% or less, and the degree of polarization is 92% or more.

COMPARISON EXAMPLE 1

By using the steps as discussed with respect to embodiment 1 described above, a lattice of Al and of Pt are formed. T1 is 81% and 79%, and T2 is 5% and 6%, and the degree of polarization is 82% and 85% respectively.

Finally, technical advantages of the present invention will now be described. According to the present invention, a fine line of a thin film of metal or semiconductor is formed in lattice form on a side wall (a side wall of a groove) which is formed on a transparent substrate and thereby a polarizer of visible light is formed. As a consequence, an aspect ratio is improved and thus light transmittance is improved, as is the degree of polarization. Colorlessness and transparency which is suitable for a display application is obtained, and enables a device to be made over a large area of 50×50 mm or more.

According to the present invention, material of the fine line is Si or Ge, and thereby higher degree of polarization can be obtained.

According to the present invention, material transparent to visible light is buried in between the lines, and thereby original performance of the polarizer is not obstructed, and the fine line is fixed stable, and the transmission light is prevented from diffracting and scattering by the convex and the concave line.

Obviously, numerous modifications and variations of the present invention are possible in light of the above teachings. It is therefore to be understood that within the scope of the appended claims, the invention may be practiced otherwise than as specifically described herein.

The present document claims priority to Japanese Patent Application No. 08-329198, filed Nov. 25, 1996, the entire contents of which is incorporated herein by reference.

What is claimed as new and desired to be secured by Letters Patent of the United States is:

1. A method of making a polarizer comprising the steps of:
   forming plural grooved lines on a surface of a supporting body that is transparent to visible light, comprising forming each of said plural grooved lines to be substantially straight in direction, concave in cross-section and parallel with respect to each other, each of said plural grooved lines having a substantially continuous sidewall;
   forming a thin film over at least a portion of said substrate that includes said plural grooved lines, said thin film comprising at least one of a semiconductor and a metal; and
   etching away a portion of said thin film and creating a fine line with a residual portion of said thin film in each of said plural grooved lines, said fine line being formed on said sidewall of each of said plural grooved lines and said residual portion of said thin film being removed from other portions of each of said plural grooved lines.

2. The method of claim 1, wherein said step of creating a fine line comprises creating said fine line with said residual portion comprising one of Ge and Si.

3. The method of claim 1, wherein said step of creating a fine line comprises disposing a transparent material between the fine lines.

4. A polarizer comprising:
   a supporting body made of a material being transparent to visible light and having plural grooved lines formed on a surface thereof, each said plural grooved lines being substantially straight in direction, concave in cross-section and parallel to one another, each of said plural grooved lines having a substantially continuous sidewall portion; and
   a fine line formed on the sidewall portion of each of said plural grooved lines, said fine line comprising at least one of a semiconductor and a metal.

5. The polarizer of claim 4, wherein the fine line is formed in an inclusive width range of 50 Å to 300 Å and in an inclusive height range of 0.1 μm to 100 μm and in an inclusive interval spacing range of 0.5 μm to 1.5 μm.

6. The polarizer of claim 5, wherein said polarizer occupies an area of 50×50 mm or more.

7. An apparatus for making a polarizer comprising:

means for forming plural grooved lines on a surface of a supporting body that is transparent to visible light, comprising means for forming each said plural grooved lines to be substantially straight in direction, concave in cross-section and parallel with respect to each other, each of said plural grooved lines having a substantially continuous sidewall;

means for forming a thin film over at least a portion of said substrate that includes said plural grooved lines, said thin film comprising at least one of a semiconductor and a metal; and means for etching away a portion of said thin film comprising means for creating a fine line with a residual portion of said thin film in each of said plural grooved lines, said fine line being formed on said sidewall of each of said plural grooved lines and said residual portion of said thin film being removed from other portions of each of said plural grooved lines.

8. The apparatus of claim 7, wherein said means for creating a fine line comprises means for creating said fine line with said residual portion comprising one of Ge and Si.

9. The apparatus of claim 7, wherein said means for creating a fine line comprises means for disposing a transparent material between the fine lines.

* * * * *